Nov. 3, 1936.                P. E. CATE                2,059,931
              AUTOMATIC SOLDERING AND SEALING MACHINE
                    Filed Sept. 2, 1932    10 Sheets-Sheet 1

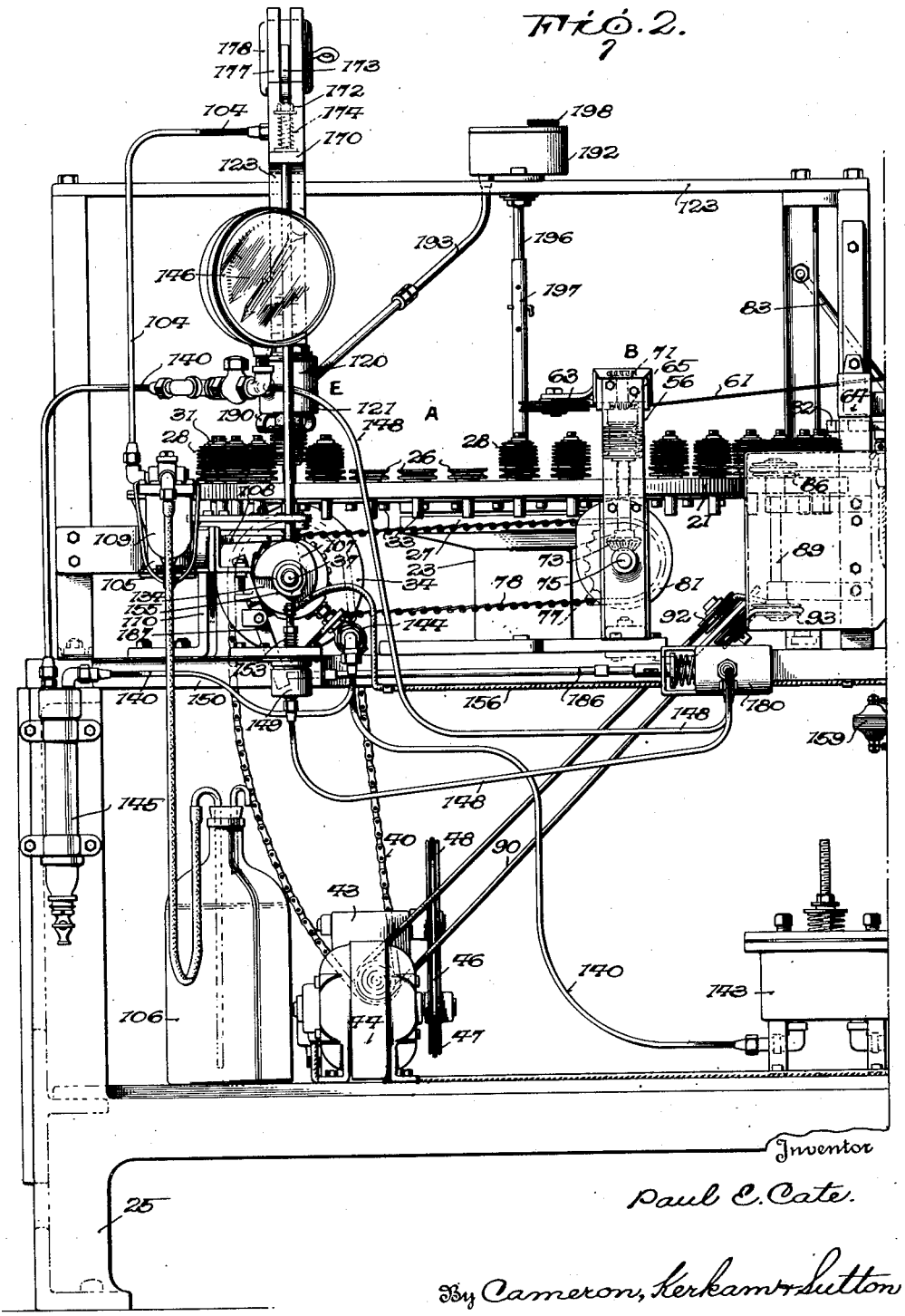

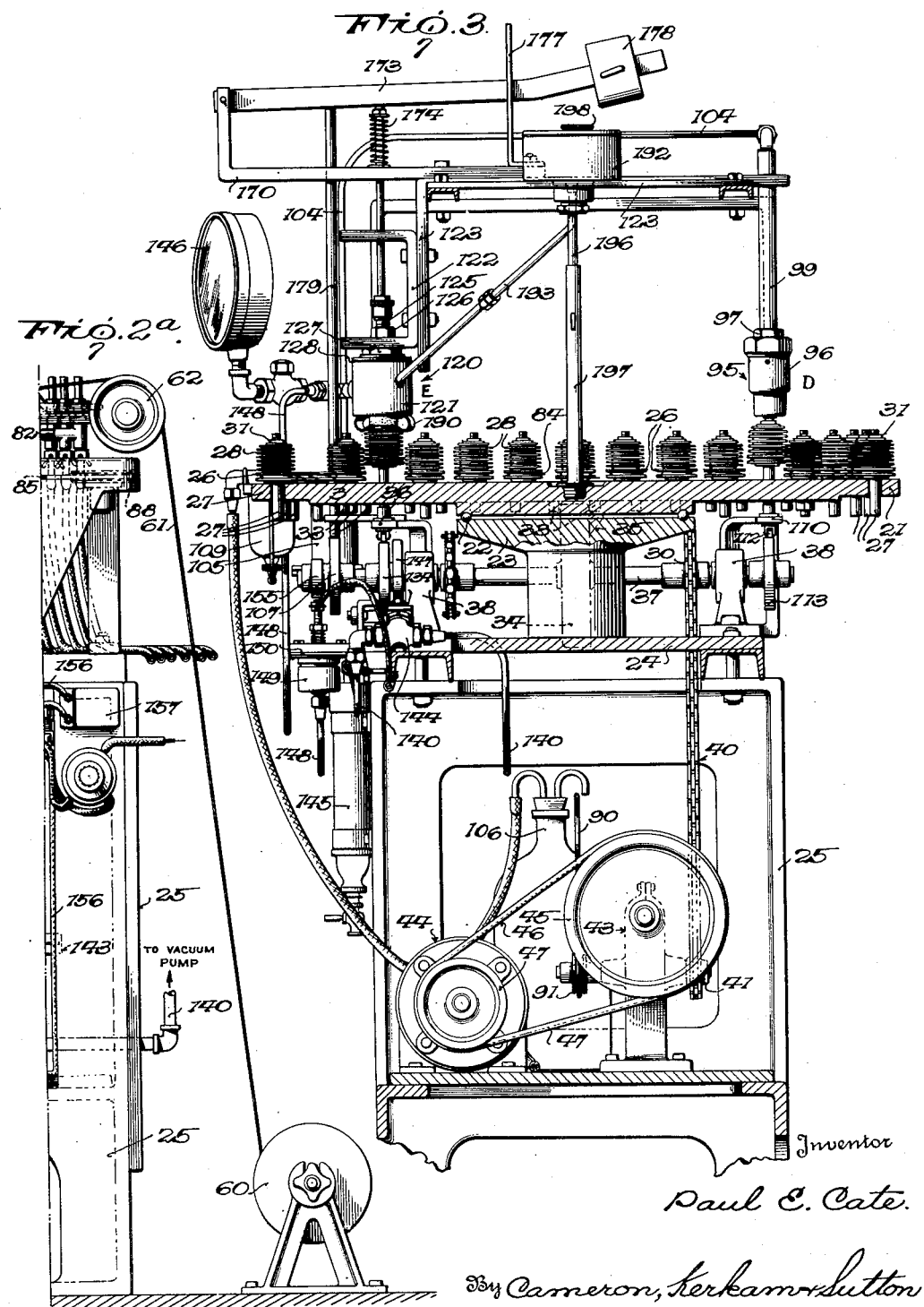

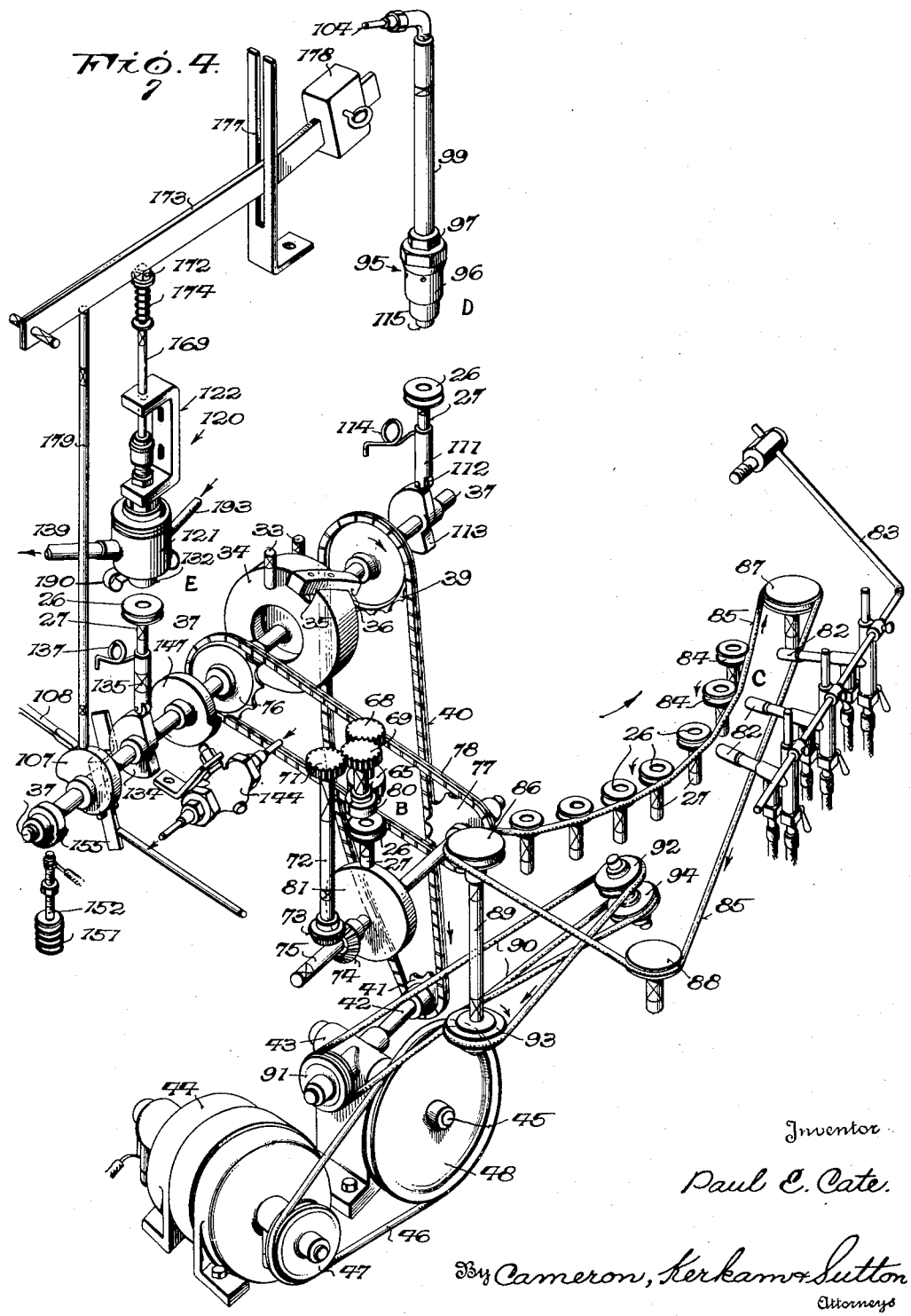

Nov. 3, 1936.                P. E. CATE                2,059,931
                AUTOMATIC SOLDERING AND SEALING MACHINE
                Filed Sept. 2, 1932        10 Sheets-Sheet 5

Paul E. Cate.
By Cameron, Kerkam & Sutton
                        Attorneys

Nov. 3, 1936.    P. E. CATE    2,059,931
AUTOMATIC SOLDERING AND SEALING MACHINE
Filed Sept. 2, 1932    10 Sheets-Sheet 6
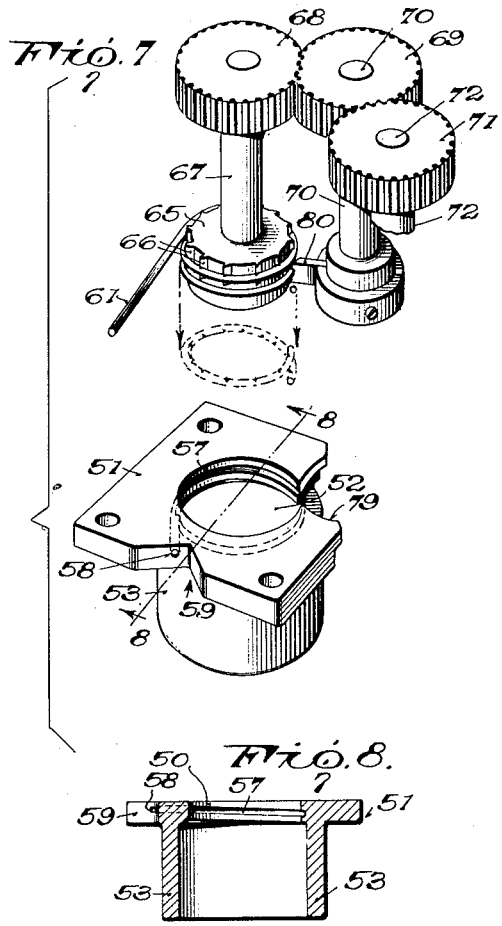
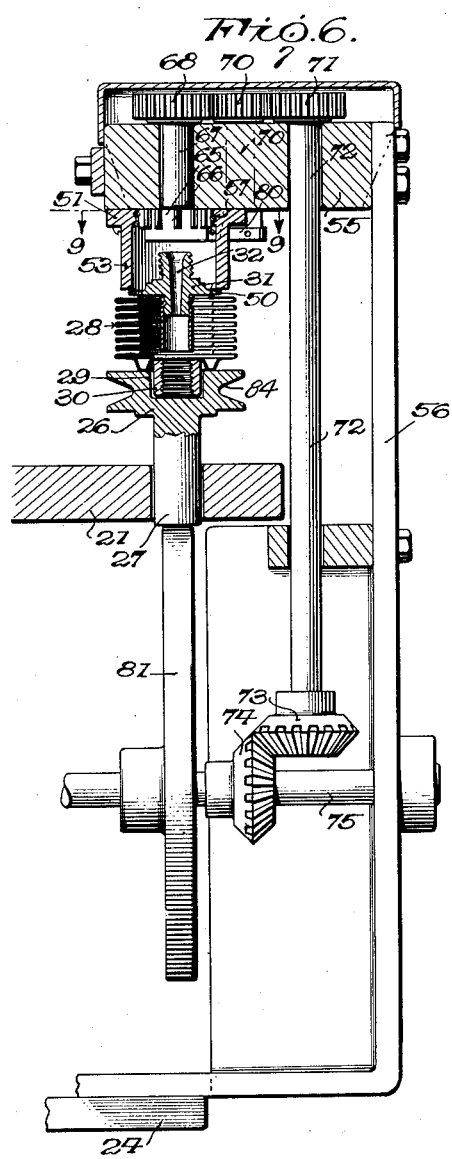
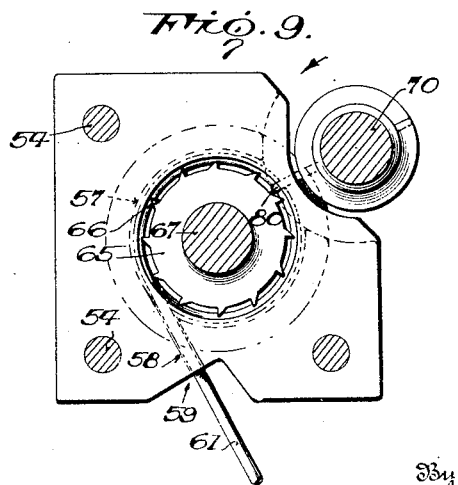
Inventor
Paul E. Cate.
By Cameron, Kerkam & Sutton
Attorneys Nov. 3, 1936.   P. E. CATE   2,059,931
AUTOMATIC SOLDERING AND SEALING MACHINE
Filed Sept. 2, 1932   10 Sheets-Sheet 7
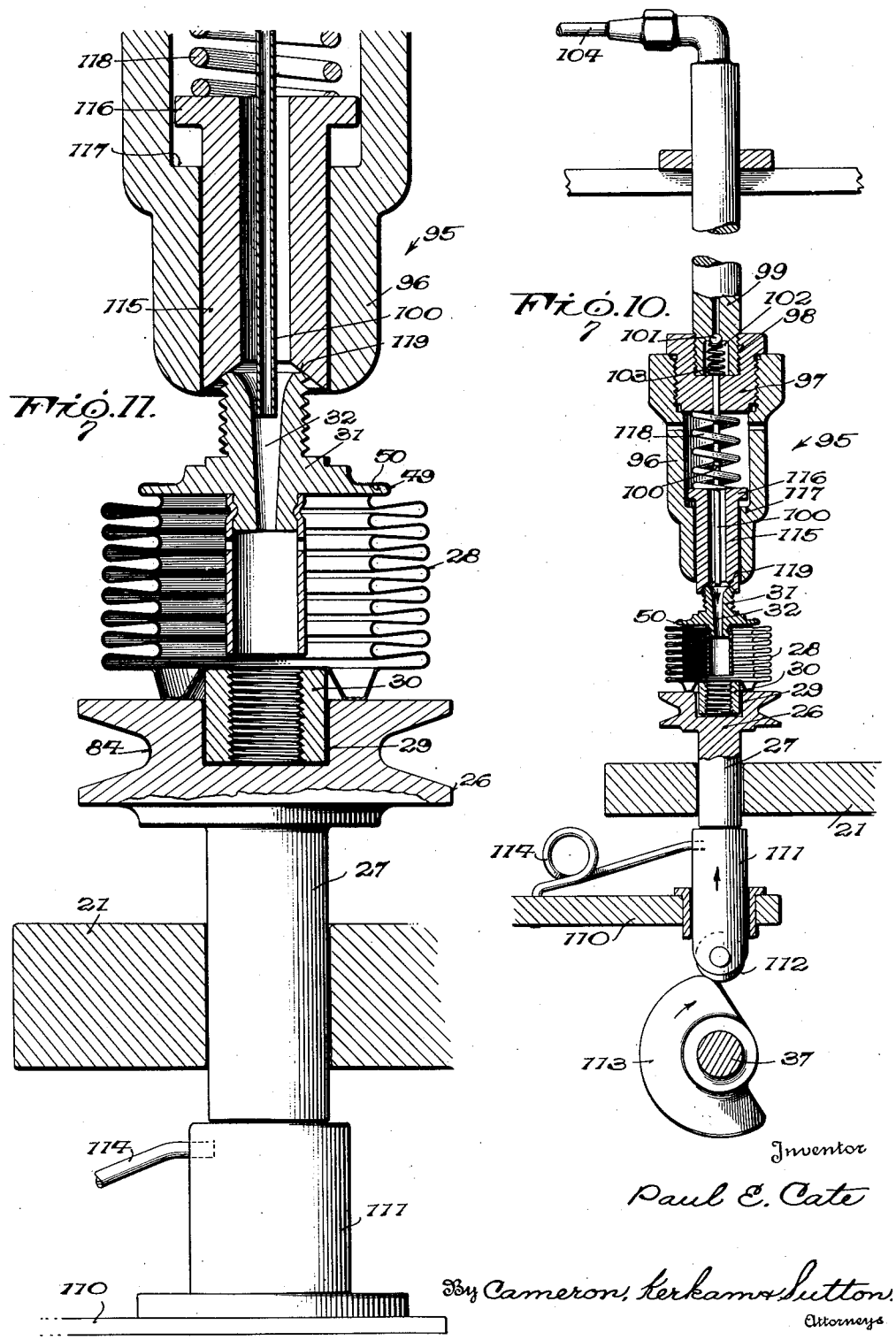
Inventor
Paul E. Cate
By Cameron, Kerkam & Sutton
Attorneys

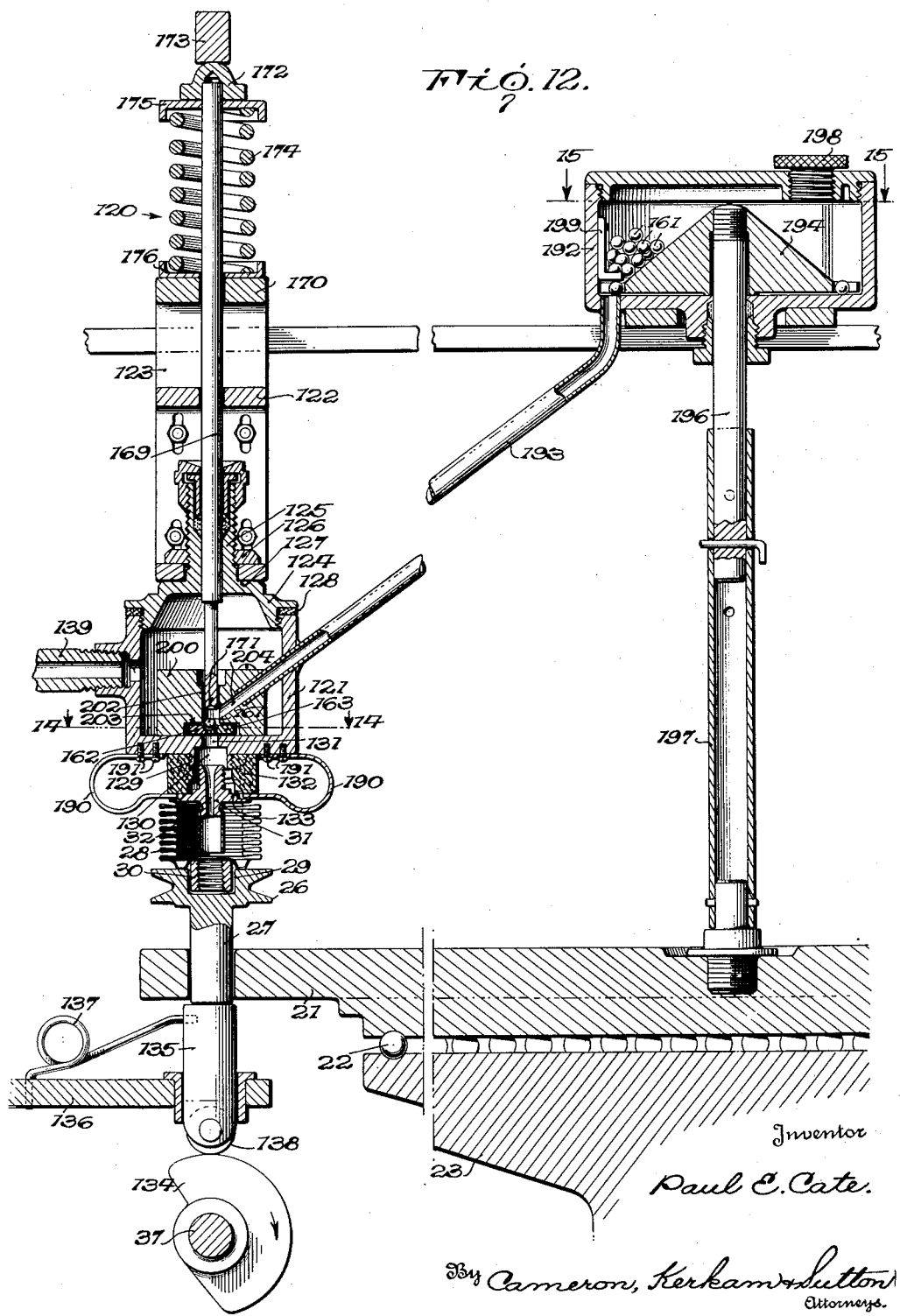

Nov. 3, 1936.  P. E. CATE  2,059,931
AUTOMATIC SOLDERING AND SEALING MACHINE
Filed Sept. 2, 1932  10 Sheets-Sheet 9
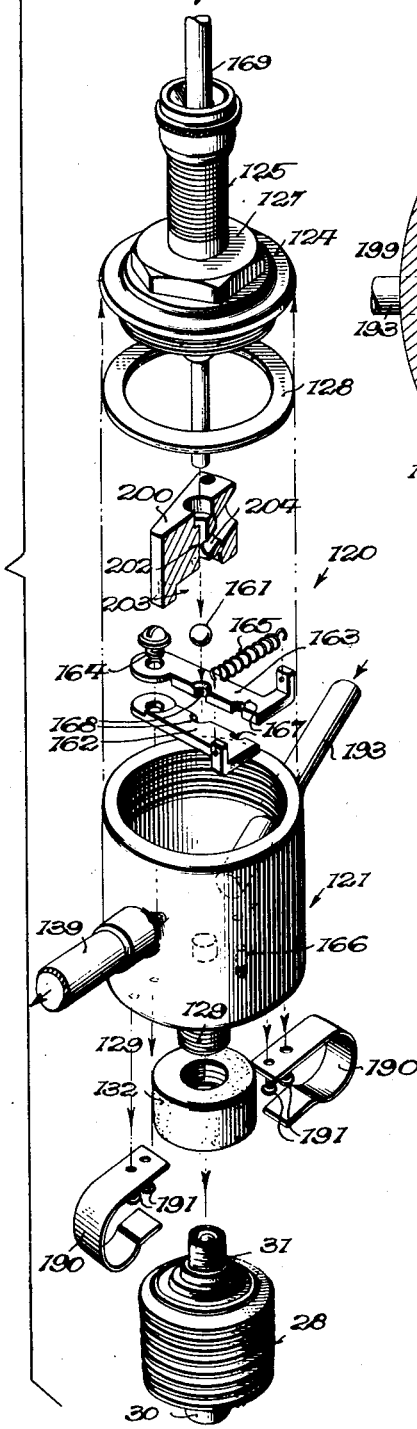
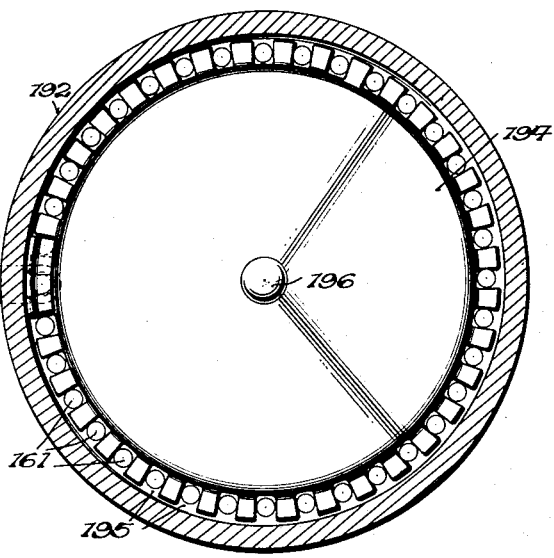
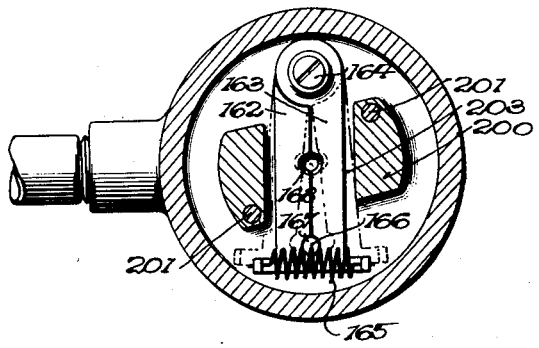
Inventor
Paul E. Cate.
By Cameron, Kerkam & Sutton
Attorneys Nov. 3, 1936. P. E. CATE 2,059,931
AUTOMATIC SOLDERING AND SEALING MACHINE
Filed Sept. 2, 1932 10 Sheets-Sheet 10
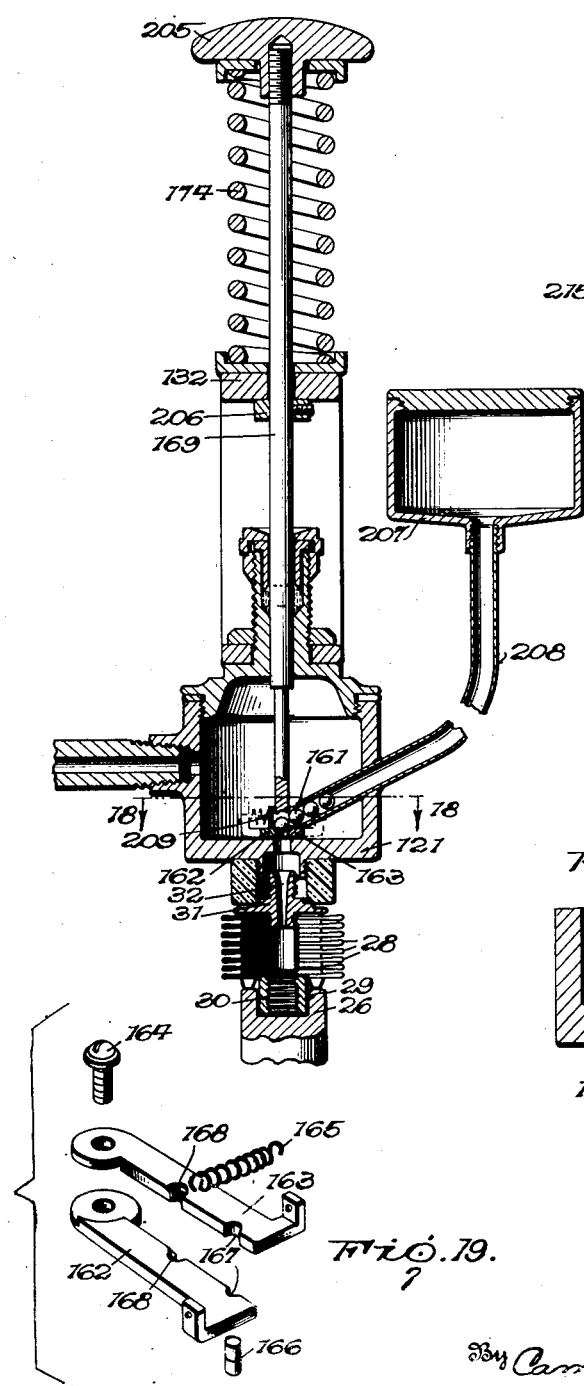
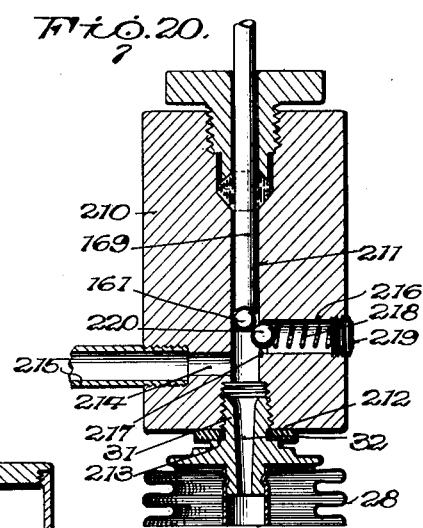
Inventor
Paul E. Cate.

Patented Nov. 3, 1936

2,059,931

UNITED STATES PATENT OFFICE 2,059,931

AUTOMATIC SOLDERING AND SEALING MACHINE

Paul E. Cate, Knoxville, Tenn., assignor to The Fulton Sylphon Company, Knoxville, Tenn., a corporation of Delaware Application September 2, 1932, Serial No. 631,597

33 Claims. (Cl. 226—82)

This invention relates to devices for charging and sealing vessels, and more particularly to machines for automatically charging, evacuating and sealing vessels of the expansible and contractible or bellows type adapted for use as thermostatic elements and the like.

One of the objects of the present invention is to provide a machine of novel construction which is capable of automatically operating upon a succession of vessels or bellows to charge, increase or decrease the pressure within, and seal the same in a rapid and efficient manner.

Another object is to provide a new and improved machine for automatically soldering the heads of, charging and sealing a plurality of vessels or bellows one after another by the coordinated action of a plurality of individual mechanisms combined in a unitary structure and actuated from a common source.

A further object is to provide a novel self-contained machine which is capable of soldering the heads of bellows to the bodies thereof, charging the bellows with a suitable liquid, increasing or decreasing the pressure within the bellows, and then sealing them, all of said operations being carried out in succession upon a plurality of bellows which are automatically advanced through the machine.

Still another object is to provide a bellows handling machine with a novel form of mechanism for forming rings of solder and for depositing said rings upon the heads of successive bellows as the latter are advanced through said machine.

A still further object is to provide an improved form of mechanism for automatically delivering to a succession of vessels or bellows measured charges of liquid.

Another object is to provide new and efficient means for increasing or decreasing the pressure within a bellows and for sealing said bellows when the proper pressure has been obtained.

Another object is to provide a bellows evacuating and sealing mechanism of improved construction which embodies means for supplying the sealing or bellows closure members thereto in an automatic and continuous manner without the necessity for manual repriming of the sealing means.

These and other objects, including the embodiment in bellows evacuating mechanism of means for rendering a warning signal whenever the vacuum produced in the bellows varies from a predetermined standard, and the provision of ball closure members for sealing the bellows which are especially well adapted for use in continuous feed devices, will appear more fully from a consideration of the detailed description of the embodiment of the invention which follows.

Although the accompanying drawings illustrate but one complete bellows handling machine, but including several embodiments of the sealing mechanism, it is to be expressly understood that these drawings are for the purpose of illustration only and are not to be construed as limiting the scope of the invention, reference being had for this purpose to the appended claims.

Referring now to the drawings, wherein like reference characters indicate like parts throughout the several views:

Fig. 1 is a plan view of a unitary bellows handling machine constituting one embodiment of the present invention;

Figs. 2 and 2a, when joined together, constitute a side elevation of the embodiment of Fig. 1;

Fig. 3 is a vertical sectional view, with certain parts shown in full, taken substantially on the line 3—3 of Fig. 1;

Fig. 4 is a skeletonized perspective view of the drive and principal elements of the machine of Fig. 1;

Fig. 5 is a diagrammatic representation of the bellows filling, evacuating and sealing mechanisms embodied in the machine of Fig. 1, the piping associated with the same and the cam means for actuating them;

Fig. 6 is a vertical sectional view, with certain parts shown in full, of the solder ring forming mechanism of the machine disclosed in Fig. 1;

Fig. 7 is a drawn-out perspective view of the principal elements of the mechanism of Fig. 6;

Fig. 8 is a vertical sectional view of the solder ring forming block taken substantially on line 8—8 of Fig. 7;

Fig. 9 is a horizontal sectional view taken substantially on line 9—9 of Fig. 6;

Fig. 10 is a vertical sectional view, with certain parts shown in full, of the charge delivering mechanism of the machine disclosed in Fig. 1;

Fig. 11 is an enlarged view of a portion of the mechanism shown in Fig. 10 with the parts shown in charge delivering position;

Fig. 12 is a vertical sectional view, with certain parts shown in full, of the bellows evacuating and sealing mechanism of the machine disclosed in Fig. 1;

Fig. 13 is a drawn-out perspective view of a portion of the mechanism shown in Fig. 12;

Fig. 14 is a horizontal sectional view taken substantially on line 14—14 of Fig. 12;

Fig. 15 is a horizontal sectional view taken substantially on line 15—15 of Fig. 12;

Fig. 16 is a vertical sectional view, with certain parts shown in full, of another embodiment of bellows evacuating and sealing mechanism;

Fig. 17 is an enlarged vertical sectional view of a portion of the mechanism of Fig. 16 taken on a plane at right angles to that of the latter and showing the parts in bellows sealing position;

Fig. 18 is a horizontal sectional view taken substantially on line 18—18 of Fig. 16 with the parts in the sealing position of Fig. 17;

Fig. 19 is a drawn-out perspective view of the elements forming the suspension seat for the bellows closure members of both the embodiments of Figs. 12 and 16; and Fig. 20 is a vertical sectional view, with certain parts shown in full, of a portion of still another embodiment of bellows evacuating and sealing mechanism.

There is disclosed in the drawings a unitary self-contained bellows handling machine of novel construction which is capable of soldering the heads of bellows to the bodies thereof, filling the bellows with measured charges of a suitable liquid, increasing or decreasing the pressure within the bellows and finally sealing the same in a rapid and efficient manner, all of said operations being performed upon a succession of bellows which are advanced through the machine in timed relation with the operation of the various soldering, filling, pressure varying and sealing mechanisms. The machine includes a movable carrier, here shown as a rotatable table, on which are mounted a plurality of bellows seat members each of which is adapted to support a bellows having a body and an upwardly extending head with an orifice therein, and various devices positioned adjacent to or above the path of movement of the bellows on said carrier for performing the soldering, filling, pressure varying and sealing operations.

In the embodiment illustrated, the carrier or table is moved intermittently to advance the successive bellows to positions adjacent to or beneath the various mechanisms, the latter being so located as to coincide with at-rest positions of the bellows seat members. As the carrier comes to rest with the bellows beneath the various mechanisms, the seat members are moved or raised so as to bring the bellows into close cooperative relationship with the respective mechanisms. The complete machine thus provided is capable of automatic and continuous operation, and handles bellows in a far more rapid and efficient manner than any of the devices previously known to the art.

Referring now to Figs. 1–5, the bellows handling machine of the present invention may embody a movable carrier in the form of a table 21 rotatably supported as by suitable ball bearings 22 on a pedestal 23 which is in turn suitably mounted on the top plate 24 of a supporting framework 25. Table 21 carries at circumferentially spaced points about its periphery a plurality of seat members or fixtures 26 each of which is provided with a downwardly extending stem or pin 27 projecting through and beneath table 21 in position to be engaged by means later to be described for raising or lifting seat members 26 to bring the bellows supported thereon into engagement with the soldering, filling and sealing mechanisms. Each of seat members 26 is adapted to support a bellows or other vessel 28 and, as shown best in Figs. 6, 10, 11 and 12, is preferably provided with a recess 29 designed to receive the bottom head 30 of said bellows 28. Each of bellows 28 is provided with the usual corrugated body portion and an upwardly extending head 31 in which there is formed a suitable tapered orifice 32 through which the bellows may be charged, and its pressure increased or decreased as desired.

Spaced at intervals about the periphery of table 21, and preferably located immediately above the path of travel of bellows 28, are the various mechanisms for performing the soldering, filling or charging, pressure varying and sealing operations upon the successive bellows as they are advanced through the machine. The stations at which the various operations are performed have been indicated generally by the reference characters A, B, C, D and E. At station A empty, unsealed bellows, the upper heads 31 of which are secured to the bodies only by the engagement of the upper corrugations with the flanges of the heads (see Fig. 11), are placed upon seat members 26 either by any suitable mechanical means or by an operator located at this station. At station B rings of solder are formed and cut from a suitable supply of wire solder and are deposited one at a time upon the heads 31 of bellows 28, while at station C the solder rings are melted so as to seal the previously fluxed joints between heads 31 and the bodies of bellows 28. At station D a measured amount of any suitable liquid with which it is desired to charge the bellows is introduced into each bellows through orifice 32 of upper head 31. At station E the pressure within the bellows is either increased or decreased, as desired, the machine shown in the drawings being adapted for evacuation of the bellows after the charging operation, and the bellows are finally sealed by driving closure members into orifices 32. As the filled and sealed bellows again approach station A, they are removed from seat members 26, either mechanically or manually, and, if desired, the closure members may be securely soldered in place.

Any suitable means may be provided for moving carrier or table 21 to advance the successive bellows to the various soldering, charging, evacuating and sealing mechanisms, the embodiment illustrated including a plurality of studs 33 secured to and projecting downwardly from the underside of table 21, and a substantially cylindrical cam 34, shown best in Fig. 4, having a diagonal slot 35 formed in its periphery and a stud engaging arm 36 forming one side of said slot and extending outwardly at one end beyond the side of cam 34 in such position that, as the cam is rotated by main driving shaft 37 upon which it is mounted, the end of arm 36 engages one of studs 33 and forces it to follow groove 35 until it passes therefrom on the opposite side of cam 34, thus rotating table 21 through an angular distance equal to the arc subtended by radii passing through two adjacent studs 33. In the embodiment illustrated, the direction of rotation of table 21 is counter-clockwise. Studs 33 are preferably equal in number to the bellows supporting seat members 26, and are spaced at regular intervals at a uniform radius, so that table 21 is intermittently rotated in a proper manner to bring the bellows one after another to positions coincident with the locations of the various mechanisms. It will be noted that studs 33 are spaced apart a distance only slightly greater than the width of cam 34 and thus form a lock with said cam preventing movement of table 21 except when said studs are acted upon by groove 35 of cam 34.

Main driving shaft 37, upon which table turning cam 34 is mounted, may be journaled in suitable bearings 38 beneath table 21 and extend substantially across said table tangent to the circle marking the locus of studs 33. Shaft 37 is adapted to be continuously driven in any suitable manner, the drive illustrated comprising, as shown best in Fig. 4, a sprocket wheel 39 secured to shaft 37, a chain 40 passing around sprocket wheel 39 and another sprocket 41 which is mounted upon the output shaft 42 of a speed reducing device 43, and a motor 44 which drives the input shaft 45 of speed reducer 43 as by a belt 46 and pulleys 47 and 48.

As previously mentioned, when the vessels being handled by the present machine are of the bellows type, they are usually supplied to the machine with the upper heads secured to the bodies only by mechanical engagement of the topmost corrugation 49 (see Fig. 11) with the flange 50 of the head, and although these joints are usually fluxed before the bellows are placed upon seat members 26, it is preferable that they be soldered during the passage of the bellows through the machine. To this end, there is provided at station B suitable mechanism for forming rings of solder and depositing said rings upon the heads of the successive bellows.

As shown in detail in Figs. 6–9, the solder ring forming mechanism includes a ring forming block 51 having a cylindrical bore 52 and a downwardly extending cylindrical guide sleeve 53, said block being secured as by screws or bolts 54 to the underside of a supporting block 55 in such position that bore 52 and sleeve 53 are coaxial with one of the at-rest positions of a bellows seat member 26. The diameters of bore 52 and sleeve 53 are preferably made slightly smaller than that of flanges 50 of the bellows heads. Supporting block 55 may be suitably mounted so as to overhang the path of movement of the bellows as by a bracket 56 secured to top plate 24 of supporting framework 25. Bore 52 of ring forming block 51 is provided with a helical groove 57, substantially semicircular in cross section, the upper end of said groove communicating through a passageway 58 with an outer edge of block 51, preferably cut away to form a V-shaped entrance to said passageway as indicated at 59, while the lower end of said groove is flush with the bottom surface of block 51 and leads directly into the interior of cylindrical guide sleeve 53.

The solder from which the rings are formed in block 51 in a manner later to be described may be supplied to said block in the usual wire form from any suitable source of supply such as a reel 60 (Figs. 1 and 2a) mounted adjacent supporting framework 25, the wire solder 61 leading upwardly from said reel over a guide pulley 62 suitably supported by the superstructure of the supporting framework, and around a second guide pulley 63 mounted on supporting block 55 whence it passes through passageway 58 into helical groove 57. It is preferable that, in its passage to ring forming block 51, wire solder 61 be lubricated in order to facilitate its passage through helical groove 57, and in the form shown it passes through a suitable lubricating device 64 which may contain a felt or other absorbent pad moistened with any suitable lubricant not detrimental to the soldering operation, such as glycerine.

Any suitable means may be provided for continuously feeding wire solder 61 through helical groove 57 so as to convert the straight wire solder into a helical coil such that successive convolutions thereof may be cut off so as to form individual split rings of solder. In the form shown, a wheel 65 having sharp teeth 66 projecting outwardly from the upper portion of its periphery is mounted within bore 52 of block 51, the untoothed portion extending downwardly into sleeve 53 and the outer diameter of teeth 66 being such that wheel 65 may rotate freely within bore 52 and yet said teeth may bite into the portion of the surface of wire solder 61 which projects inwardly beyond the confines of groove 57. Wheel 65 is mounted for rotation within bore 52 on a suitable shaft 67 which is journaled in supporting block 55, shaft 67 having secured to its upper end above block 55 a suitable gear 68 which meshes with a similar gear 69 mounted on a shaft 70 likewise journaled in supporting block 55. Gear 69 in turn meshes with another gear 71 secured to the upper end of a shaft 72 which is journaled within supporting block 55 and extends therethrough and downwardly therebelow, just outside the periphery of table 21, terminating in a suitable bevel gear 73 which meshes with a similar gear 74 mounted on a jack shaft 75 extending inwardly under table 21. As shown best in Fig. 4, jack shaft 75 is continuously driven from main driving shaft 37 in any suitable manner as by sprocket wheels 76 and 77 and driving chain 78. With this construction, it will be seen that shaft 67 and toothed wheel 65 are continuously rotated, and due to the biting engagement of teeth 66 with the wire solder, the latter is continuously drawn into and fed through helical groove 57.

The mechanism just described forms the solder into a continuous helical coil, and means must therefore be provided for cutting successive convolutions off said coil to form suitable rings which may be deposited upon the successive bellows heads. To this end, ring forming block 51 is cut away, as indicated at 79, on an arc substantially tangent to the surface of bore 52 at a point substantially diametrically opposite the upper end of helical groove 57 so as to provide space for the movement of a suitable knife member 80 which is secured for rotation therewith to the lower end of shaft 70. The length of knife member 80 is so selected that the arc of movement of its cutting edge is substantially tangent to the untoothed portion of the periphery of wheel 65, and said knife member is preferably so positioned on shaft 70 as to lie in a plane below that of the toothed portion of said wheel. Gears 68 and 69 are also preferably of the same size so that knife member 80 and toothed wheel 65 have the same angular speeds of rotation. With this construction the helically coiled wire solder 61 is cut once in every rotation of toothed wheel 65, the locus of the cut being in the second coil of the helix measured from the entrance end of groove 57 and just after the solder leaves the bottom of said groove and enters within cylindrical guide sleeve 53. When the cut is made in this manner the split ring of solder thus formed may drop freely downward within guide sleeve 53 and be deposited upon the upper head 31 of the bellows then positioned beneath the ring forming mechanism.

In order to insure that the rings of solder thus formed are accurately deposited upon the bellows heads in the proper position, suitable means may be provided for moving or lifting each bellows 28 into close cooperative relationship with guide sleeve 53 as said bellows comes to rest beneath the solder ring forming mechanism. In the embodiment illustrated, jack shaft 75 is provided with a suitable cam 81 which is positioned directly below the at-rest position of the stem or pin 27 of the seat member 26 upon which is supported the bellows 28 which is in position to receive a ring of solder. Cam member 81 is so shaped and so positioned on jack shaft 75 that after table 21 comes to rest with a bellows directly beneath the solder ring forming mechanism, the high part of cam 81 engages the bottom end of stem or pin 27 and raises or lifts seat member 26 and the bellows supported thereon until flange 50 of bellows head 31 abuts the lower edge of guide sleeve 53. It then maintains the bellows in that position until knife member 80 severs a split ring of solder from the helical coil formed by groove 57 and said ring drops downwardly within guide sleeve 53 on top of the joint between bellows head 31 and the body of the bellows. Further rotation of cam member 81 then lowers seat member 26 and the supported bellows 28 to their normal positions just before the next movement of carrier or table 21 takes place.

From station B where the split rings of solder are thus formed and deposited upon the successive bellows heads, continued movement of carrier or table 21 advances the bellows to station C where suitable means are provided for melting the solder so as to properly seal the joints between the upper bellows heads and the bellows bodies. As shown best in Figs. 1 and 4, the present embodiment of the machine includes a plurality of gas-air torches 82 of any desired construction, adjustably mounted closely adjacent the path of movement of the bellows, as on a supporting rod or bracket 83, and so positioned as to direct their blasts against the upper bellows heads of the bellows in at-rest positions of the table or carrier 21. Although only three torches 82 have been shown in the drawings, it will be understood that any desired number may be utilized and positioned in any suitable manner.

Since it is desirable that the heat created by the torches 82 be evenly distributed throughout each bellows head, suitable means may be provided for revolving or rotating each bellows upon its axis while it is within the zone of heat created by the torches. In the form shown, each bellows seat member 26 is provided with a circumferential groove 84 which is adapted to be frictionally engaged by a continuously moving belt 85 during the time that the bellows are within the zone of heat created by torches 82. As shown best in Fig. 4, belt 85 is adapted to travel in a substantially triangular path about suitable pulleys 86, 87 and 88, pulleys 86 and 87 being mounted closely adjacent the periphery of table 21 and so located with respect thereto that the run of belt 85 therebetween is in contact with grooves 84 of bellows seat members 26. Pulley 86 is also the driving pulley for belt 85, being secured to a suitable shaft 89 which is continuously driven from output shaft 42 of speed reducing mechanism 43 in any desired manner, as by a continuous belt 90 which passes around a pulley 91 mounted on output shaft 42, an idler pulley 92, a pulley 93 secured to shaft 89, a second idler pulley 94 and thence back to pulley 91. With this construction, it is possible to continuously rotate the bellows about their individual axes, and relatively to the carrier or table, during the entire time that said bellows are within the zone of heat created by the torches.

In handling vessels of various sorts it is often desirable that a measured charge of liquid be supplied to each vessel before it is sealed, and this is particularly true when the vessels in question are those of the expansible and contractible, or bellows, type which are adapted to be used as thermostatic elements and the like, to the handling of which class of vessels the machine provided by the present invention is especially directed. Accordingly, in the embodiment illustrated, there is provided at station D, to which the bellows are advanced by table 21 after the completion of the soldering operation at station C, novel means for delivering to the interior of each bellows a measured charge of any suitable liquid.

As shown in detail in Figs. 10 and 11, the charge delivering mechanism, indicated generally at 95, located at station D may comprise a substantially cylindrical casing or body 96 in the upper end of which is threaded a closure block 97 which is in turn provided with an internally threaded recess 98 in its upper surface adapted to receive the lower threaded end of a comparatively thick-walled pipe 99. Closure block 97 is also provided with a suitable charge delivery tube 100 which leads downwardly from the base of recess 98, centrally of casing 96, with its lower end located slightly below the lower end of said casing. Tube 100 is also coaxial with the bore of pipe 99, but communication is normally prevented between said bore and said tube by a suitable ball valve member 101 which is housed in an enlarged recess 102 formed in the lower end of pipe 99 and is yieldably forced against the lower end of the bore of said pipe by a spring 103 seated against the bottom of recess 98.

The upper end of pipe 99, which is supported in any desired manner by the superstructure of the machine supporting framework 25, is connected by suitable tubing 104 with a pump 105 (Fig. 5) of any suitable type which is adapted to supply the charging fluid to charge delivery device 95 from any suitable source such as a storage bottle or reservoir 106. Pump 105 is preferably a diaphragm or impulse pump of known construction and is adapted to be actuated by a constantly rotating cam 107 of suitable configuration mounted on main driving shaft 37 and with which pump actuating lever 108 is constantly in engagement. If desired, pump 105 may also be provided with a suitable filter 109, also of known construction. With this arrangement of impulse pump 105 and spring loaded ball valve 101, a measured charge of liquid is delivered from source 106 to recess 98 and the upper end of charge delivery tube 100 once in every revolution of main driving shaft 37.

In order that the charge thus provided to charge delivery device 95 may be properly delivered without loss to the interior of a bellows 28, casing 96 and its associated elements are preferably so located as to be coaxial with one of the at-rest positions of bellows 28, and means are also preferably provided for lifting the bellows in said position into close cooperative relationship with the charge delivering mechanism. To this end, there is slidably supported in a suitable bracket arm 110 (Fig. 10) carried by the machine supporting framework 25, in a position directly beneath the at-rest position of the bellows seat member 26 on which is supported the bellows which is to be acted upon by the charge delivering mechanism, a push pin 111 carrying at its lower end a cam roller 112 and which is continuously maintained in contact with a suitable cam 113 mounted adjacent one end of main driving shaft 37, as by a spring member 114. As push pin 111 is elevated by the engagement of roller 112 with the high part of cam 113, against the tension of spring member 114, the upper surface thereof abuts the lower end of the coaxial stem 27 of seat member 26 and raises the same so as to bring the upper end and orifice 32 of bellows head 31 closely adjacent the bottom end of charge delivering tube 100 to insure that the charge is delivered to the bellows without loss. It will be understood that cams 107 and 113 are so shaped and are secured to main driving shaft 37 in such angular relation to one another and to table turning cam 34 that the movement of the table 21, the lifting of seat members 26 and bellows 28, and the actuation of pump 105 are properly coordinated in timed relation so that the measured charge of liquid is delivered to a bellows when the latter is in proper position to receive the charge.

Accurate delivery of the charge to the bellows and protection of the lower end of charge delivery tube 100 against injury may be further insured by providing charge delivering mechanism 95, as shown in Figs. 10 and 11, with a suitable sleeve member 115 which is slidably supported in the lower end of casing 96 and surrounds the lower portion of charge delivery tube 100. Sleeve 115 is normally urged outwardly of casing 96 to the fullest extent permitted by the engagement of its upper flange 116 with a shoulder 117 formed within casing 96, as by a suitable spring 118 interposed between the upper surface of said sleeve and the bottom surface of closure plug 97, and when in such position the lower end of sleeve 115 extends below and fully protects the lower end of charge delivery tube 100. The lower end of sleeve 115 is also preferably provided with a tapered or beveled mouth 119 against which the upper end of bellows head 31 is adapted to abut when the bellows is raised by cam 113, said tapered mouth tending to center the bellows with respect to the charge delivering mechanism 95 so that continued lifting of the bellows will move sleeve 115 upwardly against the resistance of spring 118 and enable the entry of the bottom end of charge delivery tube 100 into orifice 32 of the bellows head, Fig. 11 showing these elements in fully raised position ready for delivery of the charge.

After a charge has been delivered to the interior of a bellows, continued rotation of cam 113 brings the low portion thereof into engagement with roller 112 permitting spring member 114 to move push pin 111 downward, and seat member 26 and the bellows supported thereon to return to their normal positions whereupon table 21 is rotated another step to bring the next bellows into alignment with the charge delivery mechanism.

After the charge has been injected into the bellows, the latter must be sealed by closing orifice 32 in the bellows head to prevent the escape of the charge, and it is also often desirable that the pressure within the bellows be either increased or decreased dependent upon the conditions under which the finished bellows is to operate. In the present embodiment of the machine, there is provided at station E a unitary mechanism, indicated generally at 120, for both increasing or decreasing the pressure within the bellows and for sealing the same after the desired pressure has been obtained. In the form illustrated, the mechanism is adapted to create a vacuum of a predetermined amount within the bellows and to then seal the latter by driving a ball closure member into the orifice of the bellows head, the mechanism also embodying novel means for automatically and continuously supplying the closure members without the necessity for manual repriming after each sealing operation.

As shown in detail in Figs. 12-15 and 19, the combined evacuating and sealing mechanism 120 includes a substantially cylindrical casing 121 which may be supported in any suitable manner above the path of movement of the bellows supported on table 21 and coaxial with one of their at-rest positions. In the form shown, casing 121 is thus supported by means of a U-shaped bracket 122 which is secured, with its parallel arms in horizontal planes, to a portion of the superstructure 123 of the machine supporting framework 25, casing 121 being provided with a suitable cap or cover 124 having an upwardly extending nipple or boss 125 which passes through the lower horizontal arm of bracket 122 and is secured thereto by means of a suitable jam nut 126 which is threaded onto nipple 125 and clamps said arm between it and a horizontal shoulder 127 formed on cap 124. Cap 124 may be threaded to casing 121 as shown, the joint being made air-tight by a suitable gasket 128.

The bottom of casing 121 is provided with a centrally located, downwardly projecting nipple or boss 129 in which is formed a recess 130 having a diameter preferably exceeding that of the upper end of bellows head 31, said recess communicating with the interior of casing 121 through a suitable opening or orifice 131, also central with respect to the axis of casing 121 and preferably of slightly greater diameter than orifice 32 of the bellows head. Threaded onto the exterior of nipple 129 is a suitable gasket 132 which is also provided with a central bore of a diameter greater than that of the upper end of bellows head 31.

When table 21 has come to rest with a bellows directly beneath and coaxial with casing 121 of the evacuating and sealing mechanism 120, said bellows is raised or lifted by any suitable means into close cooperative relationship with casing 121, the upper end of bellows head 31 entering the bore of gasket 132 and recess 130 while a horizontal shoulder 133 formed on said head abuts the bottom of gasket 132 and forms an airtight joint therewith. In the form shown, the means for lifting the bellows into cooperative relationship with casing 121, so that the interior thereof is in direct communication with the interior of said casing through orifices 32 and 131, are the same as those provided for lifting the bellows at station D into position to receive the charge, comprising a cam 134 fixed to main driving shaft 37, a push pin 135 slidably mounted in a bracket 136, and spring means 137 for maintaining cam roller 138 carried by push pin 135 in contact with cam 134.

When the bellows is raised through the operation of cam 134 and push pin 135 until the upper end of bellows head 31 projects within the bore of gasket 132 and the latter forms an air-tight joint with shoulder 133, the interior of bellows 28 and that of casing 121 are in direct communication through orifices 32 and 131, and any pressure either above or below atmospheric which is created within casing 121 will also exist within the bellows. Casing 121 is therefore provided with a suitable pipe 139 which may be connected to any suitable mechanism for either increasing or decreasing the pressure within the bellows.

In the present embodiment, and as diagrammatically illustrated in Fig. 5, pipe 139 is connected by suitable tubing or piping 140 to a vacuum pump 141 of any desired construction which is continuously driven as by a motor 142. Interposed in the line 140 between vacuum pump 141 and casing 121 is a vacuum regulator 143 of any desired construction, a main controlling valve 144, a liquid trap 145 and a vacuum pressure gauge 146. Control valve 144 is adapted to be automatically opened and closed by a suitable cam 147 mounted on main driving shaft 37, said cam being so formed and positioned on shaft 37 that it opens valve 144 to connect vacuum pump 141 to the interior of casing 121 only after a bellows has been lifted or raised into cooperative relationship with said casing, and maintains said valve open a sufficient length of time to evacuate the bellows to the desired degree of vacuum. It will be noted that the high portion of cam 134 which maintains the bellows in position against the bottom of casing 121 has substantially twice the angular extent of the high part of cam 147 which maintains valve 144 open. This cam structure is provided in order that the bellows may be maintained in air-tight communication with the interior of casing 121 after the evacuation has been completed and during the sealing operation later to be described.

Although vacuum regulator 143 normally maintains the vacuum produced by pump 141 at any desired amount within narrow limits, novel means have also been provided for rendering a warning signal in the event that the vacuum created within the bellows varies materially from the predetermined desired amount. As shown, tubing or piping 140 has connected thereto a branch line 148 leading to the interior of a cup-shaped vessel 149 secured to a suitable bracket 150 in a position directly beneath one end of main driving shaft 37. Housed within cup-shaped vessel 149 is an expansible and contractible bellows member 151 having a stem 152 secured to the movable head thereof and extending upwardly through bracket 150 terminating just below shaft 37. A suitable spring 153 interposed between the upper surface of bracket 150 and a nut 154 adjustably threaded on the upper end of stem 152 normally urges said stem upwardly so as to bring bellows member 151 to its collapsed position. Opposing the force of spring 153 to collapse bellows member 151 is the vacuum created in line 140 by pump 141 and also existent within cup-shaped vessel 149 due to the connection of line 148 with line 140.

Mounted on shaft 37 directly above the upper end of stem 152 is a suitable cam 155 the high part of which is of substantially the same angular extent as and located on shaft 37 in substantially the same angular position as cam 147 which operates control valve 144. Cam 155 is electrically grounded, while the upper end of stem 152 is also grounded by an electrical circuit 156 which includes a warning signal device 157, such as a buzzer, and the secondary coil 158 of a transformer 159, the primary 160 of which may be connected to any suitable source of electrical energy. With this construction, so long as the required amount of vacuum is maintained by pump 141, bellows member 151 is extended, spring 153 is overcome and the upper end of stem 152 is held down out of contact with cam 155 thus breaking the electrical circuit through buzzer 157. If, for any reason, the required amount of vacuum cannot be maintained, spring 153 will force stem 152 upwardly to collapse bellows member 151 and to bring it into contact with the high part of cam 155 as the latter revolves with shaft 37, thus closing the electrical circuit through buzzer 157 so as to render a warning signal apprising the operator of the machine that the bellows then being sealed has not been evacuated to the required degree.

As previously mentioned, mechanism 120 embodies not only the means for evacuating the bellows but also novel means for sealing the same after evacuation. Referring again in particular to Figs. 12–15 and 19, there is provided in association with casing 121 of evacuating and sealing mechanism 120 novel means for suspending a bellows closure member within said casing above the orifice in the bellows head during evacuation of the bellows, means for driving the suspended closure member into said orifice to seal the bellows when the evacuation is completed, and means for automatically supplying closure members to the suspension means.

In the form shown, the bellows closure members, which are preferably balls 161 made of brass or other suitable material, are suspended directly above opening 131 in the bottom of casing 121, and in line with orifice 32 of bellows head 31, by a pair of separable arms or plates 162 and 163 which are pivotally secured to the bottom of casing 121 by a common screw 164 (Figs. 14 and 19) passing through the superposed circular ends of said arms and about which the latter may rotate. Arms 162 and 163 are normally maintained in abutting engagement with one another so as to completely cover opening 131, as by a suitable spring 165 the ends of which are secured to the free ends of said arms, the proper position of said arms with respect to opening 131 being maintained by the provision of a suitable stop pin 166 mounted in the bottom of casing 121 at a point diametrically opposite pivot screw 164. Each of arms 162 and 163 is provided with a semicircular recess 167 in its inner edge in which stop pin 166 is adapted to be received when said arms are in their normal closed position, as indicated best in solid lines in Fig. 14.

Intermediate recesses 167 and the pivoted ends of arms 162 and 163, each of the latter is provided with another semicircular recess 168 in its inner edge which recesses are supplementary one to the other to form an opening concentric with opening 131 and of a diameter slightly smaller than that of a ball closure member 161. The upper portions of recesses 168 may be tapered or beveled as shown so as to provide a suitable seat for the balls 161.

The ball closure member 161 is thus supported or suspended directly above orifices 131 and 32 during the evacuating operation, but when the desired degree of vacuum has been obtained within the bellows, and in timed relation with the operation of control valve 144, the ball 161 is driven downwardly so as to force arms 162 and 163 apart, against the tension of spring 165, sufficiently to permit said ball to pass through the opening formed by recesses 168, through opening 131 and into bellows orifice 32, the latter being tapered as shown so as to make a sealing fit with ball closure member 161 when the latter is driven thereinto.

Any suitable means may be provided for thus driving the closure member into the bellows orifice to seal the same, the present embodiment including a vertical plunger 169 having a sliding airtight fit within nipple or boss 125 of cap 124 of casing 121, and extending upwardly therefrom through the upper horizontal arm of bracket 122 and the horizontal arm of an L-shaped bracket 170 mounted above bracket 122 on superstructure 123, both of which serve to guide said plunger in its vertical movements. The lower end of plunger 169 extends downwardly within casing 121 and is provided with a spherically-shaped recess 171 which is adapted to engage the top of ball closure member 161 when the latter is driven downwardly to seal the bellows. The upper end of plunger 169 terminates in a suitable cap 172 which is continuously maintained in engagement with the underside of a weighted driving bar or lever 173 as by a suitable spring 174 interposed between a cup washer 175 abutting against the underside of cap 172 and a similar washer 176 resting on top of bracket 170.

Driving bar 173 is pivoted at one end to the vertical arm of bracket 170, is guided in a vertical plane by a suitable bifurcated guide member 177 mounted on bracket 170, and carries adjacent its other end an adjustable weight 178. Weighted driving bar 173 is raised and lowered in timed relation with the other mechanisms of the machine, so as to actuate plunger 169, by the same cam 107 which actuates charging pump 105 and through the agency of a suitable vertical push rod 179 the lower end of which rides on cam 107 while the upper end engages the bottom surface of bar 173 intermediate the pivot point thereof and the point of engagement with cap 172 of plunger 169.

As will be seen from the configuration of cam 107, push rod 179 and driving bar 173 are gradually raised during the time that evacuation from the bellows is taking place, and while the bellows and the interior of casing 121 are still in communication with vacuum pump 141 cam 107 permits a sudden drop of push rod 179 and bar 173 so as to cause the plunger 169 to drive the ball closure member 161 downwardly between arms 162 and 163 and into orifice 32 of the bellows to seal the latter. Upon the subsequent gradual raising of push rod 179 and driving bar 173, plunger 169 is also raised by the action of spring 174.

After the bellows has been sealed in this manner, it is preferable that the vacuum be broken within casing 121 so as to facilitate the lowering of the bellows away from the evacuating and sealing mechanism. As shown diagrammatically in Fig. 5, the vacuum within casing 121 may be broken by the provision of a suitable bleeder valve mechanism indicated generally at 180 connected into line 148 which in turn communicates with the interior of casing 121 through pipe 139. In the form illustrated, the chamber 181 of the bleeder valve mechanism is connected to line 148 and is normally prevented from communicating with the atmosphere by a valve 182. Valve 182 is maintained closed during half of each revolution of main driving shaft 37, during the time that the evacuating and sealing operations are taking place, under the action of a suitable spring 183 which is interposed between said valve and the inner face of a piston member 184, the latter being slidably mounted in the bleeder valve casing and forced to the right, as viewed in Fig. 5, against the pressure of a spring 185 by a push rod 186 which is in turn actuated by one end of a lever 187 the other end of which is in contact with the periphery of cam 134 mounted on shaft 37. When lever 187 passes off of the high part of cam 134, piston member 184 and push rod 186 are moved to the left by spring 185, permitting valve 182 to open and place chamber 181 in communication with the atmosphere and thus bleeding the vacuum created within casing 121. If desired, lever 187 may be provided with a suitable lug 188 which cooperates with a suitable stop pin or screw 189 to limit the clockwise movement of lever 187 under the action of spring 185 and prevent its following the low part of cam 134, this construction being permissible since only a small movement of the parts of the bleeder valve assembly 180 is necessary for accomplishment of its purpose.

After the bellows has been evacuated and the closure member driven into orifice 32 to seal the bellows, and the vacuum has been broken within casing 121, the bellows is lowered to its normal position by the action of cam 134 and its associated elements. If desired, casing 121 may be provided with suitable spring means for forcing bellows 28 downwardly when its associated seat member 26 is lowered by cam 134 so as to prevent the bellows from sticking to gasket 132. In the form shown, said means comprise a pair of flat, substantially U-shaped spring members 190 one end of which is secured to the bottom of casing 121 as by screws 191 while the other end is adapted to be engaged between the outer peripheries of flange 50 of bellows head 31 and of gasket 132 when the bellows is raised into cooperative relationship with evacuating and sealing mechanism 120.

In order that the machine may be automatic in operation, and that the necessity for manual repriming of the sealing means may be avoided, novel means are also provided for automatically supplying ball closure members 161 to the suspension seat means formed by arms 162 and 163 in timed relation with the operation of the various other mechanisms of the machine so that successive bellows may be rapidly and efficiently sealed. As shown in Figs. 12–15, a suitable ball closure member reservoir 192 may be fixedly mounted on superstructure 123 directly above the center of carrier or table 21 and connected to the interior of casing 121 of the evacuating and sealing mechanism by a suitable tube or chute 193. Mounted within ball reservoir 192 is a rotatable cone-shaped distributing disk 194 the periphery of which is serrated so as to provide a plurality of recesses 195 preferably equal in number to the number of bellows seat members 26 carried by table 21 and each of a width slightly greater than the diameter of a ball closure member 161 so that only one ball may be held in each recess at a time. Distributing disk 194 is secured to the upper end of a suitable stem or shaft 196 which passes downwardly through an air-tight opening in the bottom of the reservoir 192 and is adjustably secured at its lower end to a suitable hollow shaft or sleeve 197 which is in turn fixed to table 21 at the center thereof.

With this construction, distributing disk 194 is rotated step by step with table 21 so as to bring the ball closure members carried by recesses 195 one at a time over the open top of tube or chute 193 whence they may pass downwardly into casing 121. The ball closure members are supplied in bulk to reservoir 192 through a suitable filling hole in the top thereof which hole is normally closed by an air-tight cap 198. A suitable guard plate 199 may be secured to the interior of reservoir 192 just above the periphery of distributing disk 194 at the point where it passes over the entrance to tube 193 so as to prevent more than the one ball closure member carried by the recess 195 in registry with said tube from passing down thereinto.

The lower or delivery end of tube or chute 193 extends within casing 121 and terminates within a guide block 200 which is adapted to be secured centrally within casing 121 to the bottom thereof, as by suitable screws 201, in a position covering opening or orifice 131 and ball suspension arms 162 and 163. Block 200 is provided with a vertical bore 202 coaxial with opening 131 and adapted to receive the lower end of plunger 169, and with an enlarged recess 203 at the bottom of said bore extending entirely across said block and of such a width as to freely accommodate arms 162 and 163 and to permit their separation when the ball closure member supported thereby is driven downwardly therebetween by the action of plunger 169. Block 200 is also provided with a downwardly directed passageway 204 coaxial and communicating with the lower end of tube 193 and opening into bore 202 immediately above recess 203 and the seat formed in arms 162 and 163 by recesses 168.

With this construction, the normal location of the lower end of plunger 169 being just above the lower end of passageway 204, a ball closure member 161 which is delivered to the upper end of tube or chute 193 by distributing disk 194 will roll downwardly through said tube and passageway 204, and be delivered to the seat formed in the upper surfaces of arms 162 and 163 there to be suspended directly above opening 131 and orifice 32 until driven downwardly by plunger 169 to seal the bellows. After each bellows has been sealed, rotation of carrier or table 21 brings another bellows to evacuating and sealing position and also delivers another ball closure member to the upper end of tube 193 whence it is automatically supplied to the suspension seat formed by arms 162 and 163 to await the next sealing operation.

While it is believed that the operation of the bellows handling machine herein disclosed will be clear from the preceding description, said operation may be summarized as follows: At station A empty, unsealed bellows 28 are placed upon seat members 26 of the intermittently moving carrier or table 21 and are thence advanced one by one to a position directly beneath the solder ring forming device at station B. As table 21 comes to rest, the bellows seat member 26 which is directly beneath ring forming block 51 is raised by the action of cam 81 until the bellows head 31 abuts the bottom of guide sleeve 53 in position to receive a ring of solder which is then cut by rotating knife member 80 from the helical coil of wire solder formed in groove 57 of block 51 by the action of constantly rotating toothed wheel 65 and falls within guide sleeve 53 onto the bellows head. After receiving the split ring of solder thus formed, seat member 26 is lowered by cam 81 and table 21 is again advanced step by step to bring the bellows with the solder ring thereon within the zone of heat created by gas-air torches 82 located at station C. Under the heat of torches 82 the solder ring is melted so as to tightly seal the previously fluxed joint between the upper head and body of the bellows. During the heating operation, the bellows is continuously rotated upon its axis due to the cooperation of continuously moving belt 85 with groove 84 of seat member 26.

From station C table 21 advances the bellows to a position beneath the charge delivering mechanism 95 at station D. Upon coming to rest thereunder, the bellows is raised under the action of cam 113 and push pin 111 until charge delivery tube 100 enters orifice 32 of bellows head 31 at which time cam 107 actuates pump 105 so as to increase the pressure of the liquid in tubing 104 and pipe 99 to an extent sufficient to force ball valve 101 off its seat and to allow a measured quantity of charging liquid to be supplied from source 106 to charge delivery tube 100 whence it passes into the interior of bellows 28.

Upon completion of the charging operation, the bellows is again lowered and advanced by table 21 until it reaches a position at station E beneath the evacuating and sealing mechanism 120. Here the bellows is again raised under the action of cam 134 and push pin 135 until shoulder 133 of bellows head 31 abuts gasket 132 to form an air-tight joint whereupon cam 147 opens control valve 144 and connects vacuum pump 141 to the interior of casing 121 so that the bellows may be evacuated. When the proper amount of vacuum has been obtained, and before valve 144 is again closed, cam 107 through push rod 179 permits driving bar 173 to fall under the action of weight 178 so as to drive plunger 169 downward and force a ball closure member 161, which has been supported directly above orifice 32 during the evacuating operation, downwardly between suspension seat arms 162 and 163, through opening 131 in the bottom of casing 121 and into orifice 32 of the bellows to seal the same. During the evacuating operation, should the vacuum produced within the bellows vary from the required amount, spring 153 will force stem 152 of bellows member 151 upwardly into electrical contact with cam 155 so as to energize buzzer 157 and give a warning signal to the operator that that particular bellows had not been evacuated to the proper degree. After plunger 169 has driven the ball closure member home into orifice 32, cam 134 actuates bleeder valve 180 so as to bleed the vacuum within casing 121, and further rotation of cam 134, together with the assistance of spring members 199, once again lowers the bellows to its normal position.

The next movement of table 21 carries the now filled and sealed bellows toward station A where it is removed from the machine by any suitable means, mechanical or manual. This rotation of table 21 also automatically supplies another ball sealing member 161 to the suspension seat arms 162 and 163 in position to be driven into the next succeeding bellows. If desired, the completed bellows removed at station A may have the upper end of orifice 32 above ball closure member 161 filled with solder in order to further insure complete sealing.

Referring now to Figs. 16, 17 and 18, there is disclosed therein a modified form of evacuating and sealing mechanism which either may be substituted for the embodiment of Figs. 12–15 in a bellows handling machine of the character previously described, or may be utilized independently of such a unitary machine. This modified form of mechanism differs from that previously described principally in that it is adapted for manual actuation of the sealing means and in that the bellows closure members are supplied from a suitable reservoir by gravity alone without the aid of distributing disk mechanism as disclosed above. The structure for guiding and delivering the ball closure members to the suspension seat means is also somewhat more simplified than that disclosed in Figs. 12–15.

As shown, the upper end of plunger 169 is provided with a suitable cap or hand grip 205 which is adapted to be struck or gripped by the operator when moving said plunger downwardly to force the ball closure member into the orifice of the bellows. Plunger 169 is normally maintained in its uppermost position by spring 174 as previously described, there also being provided in the present embodiment a suitable stop collar 206 adjustably secured to plunger 169 beneath the upper horizontal arm of bracket 122 in which said plunger is guided, and adapted to limit the upward movement of plunger 169 and to determine the normal position of its lower end with respect to the ball closure members. The latter are supplied from a suitable air-tight reservoir 207 through a tube or chute 208 to the interior of casing 121 at a point just above and to the side of the ball suspension seat formed by supplementary recesses 168 in arms 162 and 163. A suitable vertical guide shield 209 is preferably secured to the lower end of tube 208 coaxial with and enclosing the space just above recesses 168 to which the ball closure members are delivered so as to prevent the balls from escaping from the seat into the interior of casing 121. Stop collar 206 is adjusted so that the lower end of plunger 169 normally lies within shield 209 and in position to prevent the lowermost ball closure member 161 within tube 208 from passing out of said tube until after the ball suspended on arms 162 and 163 has been driven downwardly to seal a bellows and plunger 169 has returned to its normal position.

As previously mentioned, the evacuating and sealing mechanism of Figs. 16–18 may be embodied in a bellows handling machine of the same general character as that disclosed in Figs. 1–5, in which case the bellows 28 would be raised into cooperative relationship with the bottom of casing 121 by means similar to the seat members and cam-actuated push pins previously described, or it might be utilized independently or in machines different from that disclosed, in which event the bellows may be placed in proper position by any desired means, either mechanically or manually actuated.

A portion of still another modification of evacuating and sealing mechanism is disclosed in Fig. 20, the form there illustrated being of the single unit type. As disclosed, the casing 121 of the embodiments previously described is replaced by a suitable block 210 having a vertical bore 211 the lower end of which is enlarged and internally threaded to receive the threaded upper portion of bellows head 31, bore 211 then being coaxial with orifice 32. A suitable gasket 212 may be provided between the bottom of block 210 and a shoulder 213 formed on bellows head 31 so as to make an air-tight joint. Leading into bore 211 substantially at right angles thereto is a passageway 214 which is adapted to be connected by a suitable pipe or conduit 215 with any suitable vacuum or pressure producing source (not shown). Block 210 is also provided with another horizontal passageway 216 substantially at right angles to bore 211 and above the plane of passageway 214, the inner end of which is provided with a tapered or beveled seat 217 against which is normally urged, as by a suitable spring 218 seated against an adjustable plug 219 threaded into block 210, a ball stop member 220 a portion of the periphery of which projects into bore 211 and acts as a support for a ball closure member 161. The ball closure members may be supplied to bore 211 in any suitable manner either continuously and automatically by reservoir and tube means similar to those disclosed in the preceding embodiments, or manually one at a time through bore 211 by removing plunger 169, or by any other suitable arrangement.

In using the mechanism of Fig. 20, the bellows 28 is first threaded into the lower end of bore 211 until an air-tight joint is obtained. The mechanism is then loaded or primed with a ball closure member in any desired manner, said ball being maintained in position within bore 211 by engagement with the outwardly projecting portion of ball stop member 220. The bellows is then either evacuated or has its internal pressure increased through pipe 215 and passageway 214, and when the proper pressure has been obtained ball closure member 161 is driven downwardly by plunger 169, past ball stop member 220 which is forced inwardly against spring 218, and into orifice 32 of bellows head 31 so as to seal the bellows. While the structure disclosed in Fig. 20 has been described as of the single unit type, it will be understood that the general constructional features, including the ball stop mechanism, may be embodied in any other type of evacuating and sealing means, including those disclosed in Figs. 12–18.

There is thus disclosed by the present invention a unitary machine of novel, self-contained construction which is capable of automatically filling and sealing a plurality of vessels or bellows as the latter are advanced through the machine. With the machine provided by the present invention, bellows may be soldered, charged with a measured amount of suitable liquid, evacuated or provided with an increased internal pressure, and sealed in a more rapid and efficient manner than can be done by hand or by any of the mechanical devices hitherto known to the art. Novel mechanisms for soldering the heads of bellows to the bodies thereof, supplying measured charges of liquid to the bellows, increasing or decreasing the pressure therewithin, and closing and sealing the filling orifices have been combined in a single machine and the operation thereof coordinated in timed relation with that of a movable carrier which advances the successive bellows to said mechanisms and moves them into positions in which they can be acted upon thereby.

The soldering mechanism includes novel means for forming split rings of solder from a supply of ordinary wire solder and for delivering said rings to the tops of successive bellows in proper position to seal the joint between the bellows head and body when melted. The charge delivering mechanism is also of novel construction such that delivery of the charge to the interior of the bellows without waste is insured. The invention also provides new and improved means for increasing or decreasing the pressure within a bellows and for driving a closure member into the filling orifice thereof to seal the same. Particularly it may be noted that the closure members are automatically and continuously supplied to the device thus avoiding the necessity for manual repriming after each sealing operation. The sealing mechanisms disclosed also include several novel forms of closure member supporting or suspending means which hold the closure members in position directly above the bellows orifice during the evacuating or pressure increasing operation and until driven into sealing position.

It will be obvious that the invention is not limited to the apparatus shown in the drawings, but is capable of a variety of mechanical embodiments. For example, any suitable form of movable carrier may be utilized in place of the rotatable table shown, which change may be accompanied by suitable arrangements of the various mechanisms which are adapted to act upon the vessels or bellows handled by the machine. Also, it is obvious that some of these mechanisms may be omitted from the machine, dependent upon the operations which it is desired to perform, and likewise that the mechanism shown may be embodied in other machines which include additional devices not disclosed herein. Moreover, any of the various features described may be used separately or in combination with any one or more of the other features without departing from the scope of the invention. Furthermore, although the description has referred to a machine for handling expansible and contractible elements of the bellows type, and although the invention is especially directed to the solution of a problem long standing in and peculiar to the bellows art, it is evident that the apparatus is also adapted for use in the handling of vessels other than those of the specific type described.

Various other changes, which will now appear to those skilled in the art, may be made in the form, details of construction and arrangement of the parts without departing from the spirit of the invention, and reference is therefore to be had to the appended claims for a definition of the limits of the invention.

What is claimed is:

1. In a machine for sealing bellows at both the centers and the peripheries of their heads, a movable carrier adapted to support a plurality of bellows each having a bellows head peripherally attached thereto and extending upwardly therefrom with an orifice centrally therein, means for depositing a ring of solder upon the periphery of each of said bellows heads, means for heating said bellows heads to melt said solder and seal the joints between said heads and the bodies of said bellows, means for sealing said central orifices, and means for moving said carrier to advance successive bellows to said soldering and sealing means.

2. In apparatus for sealing bellows at both the centers and the peripheries of their heads, a movable carrier, a plurality of seat members mounted on said carrier and each adapted to support a bellows thereon, each of said bellows having a body and an apertured upwardly extending head peripherally attached thereto, means for depositing a ring of solder upon the periphery of each of said bellows heads, means for heating said bellows heads to melt said solder and seal the joints between said heads and said bodies, means for sealing the apertures in said heads, said soldering and sealing means being located above said carrier, means for lifting said seat members to bring the bellows supported thereon into operative association in succession with said soldering and said sealing means, and means for moving said carrier to advance successive bellows to positions beneath said soldering and sealing means.

3. In apparatus for sealing bellows at both the centers and the peripheries of their heads, a rotatable table, a plurality of seat members mounted on said table and each adapted to support a bellows thereon, each of said bellows having a body and an upwardly extending head peripherally attached thereto and provided with an orifice therein, means for depositing a ring of solder upon the periphery of each of said bellows heads, means for heating said bellows heads to melt said solder and seal the joints between said heads and said bodies, means for rotating said bellows during said heating operation, means for sealing said bellows by closing said orifices, said soldering and sealing means being located above said table, means for lifting said seat members to bring the bellows supported thereon into operative association in succession with said soldering and said sealing means, and means for rotating said table to advance successive bellows to positions beneath said soldering and sealing means.

4. In a bellows handling machine, a movable carrier adapted to support a plurality of bellows each provided with an aperture in the head thereof, means positioned adjacent the path of movement of said bellows for creating a vacuum within said bellows, gravity means for feeding closure members into alignment with said apertures, means for driving said closure members into said apertures to seal the same after evacuation, means for moving said carrier to advance said bellows one after another to a position adjacent said evacuating and sealing means, and means actuated in timed relation with said carrier moving means for moving said bellows into direct sealing contact with said evacuating and sealing means to be acted upon thereby.

5. In a bellows handling machine, a movable carrier adapted to support a plurality of bellows each provided with an aperture in the head thereof, means positioned above the path of movement of said bellows for creating a vacuum therein, means for driving closure members into said apertures to seal the bellows after evacuation, means for moving said carrier to advance said bellows one after another to a position beneath said evacuating and sealing means, means actuated by said carrier for delivering closure members individually to said driving means, means for raising each bellows individually into direct sealing contact with said evacuating and sealing means to be acted upon thereby, and means for actuating the evacuating, sealing, carrier moving and bellows raising means in timed relation.

6. In a bellows handling machine, a movable carrier adapted to support a plurality of bellows each having an upwardly extending head with an orifice therein, means for creating a vacuum in said bellows including a casing positioned above the path of movement of said bellows, a vacuum pump connected to said casing and a control valve interposed in the line between said pump and said casing, means for moving said carrier to advance said bellows one after another to a position beneath said casing, means for raising said bellows into sealing contact with said casing with said orifice in communication with the interior of said casing, means tensioned by said raising movement to separate said bellows from said casing when said raising means is lowered, and means for actuating said control valve, carrier moving and bellows raising means in timed relation whereby said bellows are successively evacuated.

7. In a bellows handling machine, a movable carrier adapted to support a plurality of bellows, means for creating a vacuum in said bellows including a casing positioned adjacent the path of movement of said bellows, a vacuum pump connected to said casing, a valve for controlling the action of said pump on said bellows, means for moving said carrier to advance said bellows one after another to a position adjacent said casing, means for moving said bellows into sealing contact with said casing, a valve for releasing the vacuum in said casing, means for actuating said carrier moving and bellows moving means and said valves in timed relation whereby said bellows are successively evacuated, and means for producing a warning signal whenever the amount of vacuum produced in the bellows varies from a predetermined value.

8. In a bellows handling machine, a movable carrier adapted to support a plurality of bellows, means for creating a vacuum in said bellows including a casing positioned adjacent the path of movement of said bellows, a vacuum pump connected to said casing, a control valve interposed in the line between said pump and said casing and a normally closed bleeder valve connecting said casing with the atmosphere, means for moving said carrier to advance said bellows one after another to a position adjacent said casing, means for moving said bellows into cooperative relationship with said casing, and means for actuating said valves, carrier moving and bellows moving means in timed relation whereby said bellows are successively evacuated.

9. In a bellows handling machine, a movable carrier adapted to support a plurality of bellows each having an upwardly extending head with an orifice therein, means for creating a vacuum in said bellows including a casing positioned adjacent the path of movement of said bellows, a vacuum pump connected to said casing and means for controlling the evacuating effect of said pump upon said casing, means for moving said carrier to advance said bellows one after another to a position adjacent said casing, means for moving said bellows into cooperative relationship with said casing with said orifice in communication with the interior of said casing, means for actuating said controlling, carrier moving and bellows moving means in timed relation whereby said bellows are successively evacuated, and means housed within said casing for driving a closure member into said orifice to seal said bellows after evacuation.

10. In a bellows handling machine, a movable carrier adapted to support a plurality of bellows each having an upwardly extending head with an orifice therein, means for creating a vacuum in said bellows including a casing positioned adjacent the path of movement of said bellows, a vacuum pump connected to said casing and means for controlling the evacuating effect of said pump upon said casing, means for moving said carrier to advance said bellows one after another to a position adjacent said casing, means for moving said bellows into cooperative relationship with said casing with said orifice in communication with the interior of said casing, means for actuating said controlling, carrier moving and bellows moving means in timed relation whereby said bellows are successively evacuated, and means operatively associated with said casing for driving a closure member into said orifice to seal said bellows after evacuation.

11. In a bellows handling machine, a movable carrier adapted to support a plurality of bellows each having an upwardly extending head with an orifice therein, means for creating a vacuum in said bellows including a casing positioned adjacent the path of movement of said bellows, a vacuum pump connected to said casing and means for controlling the evacuating effect of said pump upon said casing, means for moving said carrier to advance said bellows one after another to a position adjacent said casing, means for moving said bellows into cooperative relationship with said casing with said orifice in communication with the interior of said casing, means housed within said casing for supporting a closure member, means for driving said closure member into said orifice to seal said bellows, and means for actuating said controlling, carrier moving, bellows moving and sealing means in timed relation whereby said bellows are successively evacuated and sealed.

12. In a bellows handling machine, a movable carrier adapted to support a plurality of bellows each having an upwardly extending head with an orifice therein, means for creating a vacuum in said bellows including a casing positioned adjacent the path of movement of said bellows, a vacuum pump connected to said casing and means for controlling the evacuating effect of said pump upon said casing, means for moving said carrier to advance said bellows one after another to a position adjacent said casing, means for moving said bellows into cooperative relationship with said casing with said orifice in communication with the interior of said casing, means housed within said casing for suspending a closure member above said orifice, means for driving said closure member into said orifice to seal said bellows after evacuation, and means for actuating said controlling, carrier moving, bellows moving and driving means in timed relation whereby said bellows are successively evacuated and sealed.

13. In a bellows handling machine, a movable carrier adapted to support a plurality of bellows each having an upwardly extending head with an orifice therein, means for creating a vacuum in said bellows including a casing positioned adjacent the path of movement of said bellows, a vacuum pump connected to said casing and means for controlling the evacuating effect of said pump upon said casing, means for moving said carrier to advance said bellows one after another to a position adjacent said casing, means for moving said bellows into cooperative relationship with said casing with said orifice in communication with the interior of said casing, means for actuating said controlling, carrier moving and bellows moving means in timed relation whereby said bellows are successively evacuated, means housed within said casing for suspending a closure member above said orifice, means for continuously supplying closure members to said suspension means, and means for driving said closure members into said orifices to seal said bellows after evacuation.

14. In a bellows handling machine, a movable carrier adapted to support a plurality of bellows each having an upwardly extending head with an orifice therein, a vacuum producing means positioned adjacent the path of movement of said carrier, means for supporting closure members in said vacuum producing means, means for supplying closure members by gravity to said supporting means, and means for moving said carrier to advance said bellows one after another to a position adjacent said vacuum producing and sealing means wherein said closure members may be received.

15. In a bellows handling machine, a movable carrier adapted to support a plurality of bellows each having an upwardly extending head with an orifice therein, vacuum producing means positioned above the path of movement of said carrier, means for suspending closure members over said orifices to seal said bellows, means for moving said carrier to advance said bellows one after another to a position beneath said vacuum producing and sealing means, means for raising said bellows into cooperative relationship with said vacuum producing and sealing means, and means for driving said closure members into said apertures after said bellows have been evacuated.

16. In a bellows handling machine, a movable carrier adapted to support a plurality of bellows each having an upwardly extending head with an orifice therein, vacuum producing means positioned adjacent the path of movement of said carrier, means in said vacuum producing means for suspending closure members to be placed in said orifices to seal said bellows, means for moving said carrier to advance said bellows one after another to a position in cooperative relationship with said vacuum producing and closure member suspending means, and means actuated in timed relation with said carrier moving means for driving said closure members into the orifices of said bellows heads.

17. In apparatus for evacuating and sealing a vessel having a head with an orifice therein, a casing having an opening therein adapted to communicate with the orifice in said head, vacuum producing means connected to said casing, means for suspending a closure member within said casing above said orifice during the production of the vacuum in said vessel, means for driving the suspended closure member into said orifice to seal the vessel when the evacuation is completed, and means for continuously supplying closure members to said suspension means.

18. In apparatus for evacuating and sealing a vessel having a head with an orifice therein, a casing having an opening therein adapted to communicate with the orifice in said head, vacuum producing means connected to said casing, means for suspending a closure member within said casing above said orifice during the production of the vacuum in said vessel, a source from which closure members are supplied, means for delivering closure members one at a time from said source to said suspension means, and means for driving the suspended closure member into said orifice to seal the vessel when the evacuation is completed.

19. In apparatus for evacuating and sealing a vessel having a head with an orifice therein, a casing having an opening therein adapted to communicate with the orifice in said head, vacuum producing means connected to said casing, means for suspending a closure member within said casing above said orifice during the production of the vacuum in said vessel, a reservoir from which closure members are supplied located outside of said casing and at a level above that of said suspension means, a conduit connecting said reservoir with the interior of said casing adjacent said suspension means, said closure members passing by gravity from said reservoir through said conduit to said suspension means, and means for driving the suspended closure member into said orifice to seal the vessel when the evacuation is completed.

20. In apparatus for evacuating and sealing a vessel having a head with an orifice therein, a casing having an opening therein adapted to communicate with the orifice in said head, vacuum producing means connected to said casing, means for suspending a closure member within said casing above said orifice during the production of the vacuum in said vessel, a reservoir from which closure members are supplied located outside of said casing and at a level above that of said suspension means, a conduit connecting said reservoir with the interior of said casing adjacent said suspension means, a distributing device in said reservoir for delivering closure members to said conduit one after another, said closure members passing by gravity through said conduit to said suspension means, and means for driving the suspended closure member into said orifice to seal the vessel when the evacuation is completed.

21. In apparatus for evacuating and sealing a vessel having a head with an orifice therein, a casing having an opening therein adapted to communicate with the orifice in said head, vacuum producing means connected to said casing, means for suspending a closure member within said casing above said orifice during the production of the vacuum in said vessel, a reservoir from which closure members are supplied located outside of said casing and at a level above that of said suspension means, a conduit connecting said reservoir with the interior of said casing adjacent said suspension means, said closure members passing by gravity from said reservoir through said conduit to said suspension means, means for preventing delivery of more than one closure member at a time to said suspension means, and means for driving the suspended closure member into said orifice to seal the vessel when the evacuation is completed.

22. In apparatus for evacuating and sealing a vessel having a head with an orifice therein, a casing having an opening therein adapted to communicate with the orifice in said head, vacuum producing means connected to said casing, means for closing the orifice after evacuation including a pair of separable arms mounted within said casing and forming a suspension seat for a closure member above said opening and orifice, means for driving said closure member between said separable arms, through said opening and into said orifice to seal said vessel, and means for moving said vessel into cooperative relationship with said casing and actuating said driving means in timed relation.

23. In apparatus for evacuating and sealing a vessel having a head with an orifice therein, a casing having an opening therein adapted to communicate with the orifice in said head, vacuum producing means connected to said casing, and means for closing the orifice after evacuation including a pair of separable arms mounted within said casing and having formed therein at their upper edges supplementary recesses constituting a suspension seat for a ball closure member above said opening and orifice, means for driving said closure member between said separable arms, through said opening and into said orifice to seal said vessel, and means for moving said vessel into cooperative relationship with said casing and actuating said driving means in timed relation.

24. In apparatus for evacuating and sealing a vessel having a head with an orifice therein, a casing having an opening therein adapted to communicate with the orifice in said head, vacuum producing means connected to said casing, and means for closing the orifice after evacuation including a pair of separable arms pivotally mounted within said casing and forming a suspension seat for a closure member above said opening and orifice, resilient means normally maintaining said arms together and resisting separation thereof, means for driving said closure member between said separable arms, through said opening and into said orifice to seal said vessel, and means for moving said vessel into cooperative relationship with said casing and actuating said driving means in timed relation.

25. In apparatus for evacuating and sealing a vessel having a head with an orifice therein, a casing having an opening therein adapted to communicate with the orifice in said head, vacuum producing means connected to said casing, and means for closing the orifice after evacuation including a pair of separable arms mounted within said casing and forming a suspension seat for a closure member above said opening and orifice, a plunger slidably mounted in said casing coaxial with said opening and with its lower end normally positioned just above the closure member supported on said suspension seat, said plunger being adapted to be driven downwardly to force said closure member between said separable arms, through said opening and into said orifice to seal said vessel, resilient means for returning said plunger to its original position after its driving stroke, and means for moving said vessel into cooperative relationship with said casing and actuating said driving means in timed relation.

26. In a bellows handling machine, a movable carrier adapted to support a plurality of bellows each having an upwardly extending head with an orifice therein, a casing positioned above the path of movement of said carrier, an opening in said casing adapted to communicate with the orifices of said bellows, vacuum producing means connected to said casing, means for moving said carrier to advance said bellows one after another to a position beneath said casing, means for raising said bellows to bring said orifices into communication with said casing opening whereby the bellows may be evacuated, means for suspending a closure member in said casing directly above said opening and orifice, plunger means for driving said closure member downwardly through said opening and into said orifice to seal said bellows, and means for actuating said carrier moving, bellows raising and plunger means in timed relation to evacuate and seal said bellows.

27. In a bellows handling machine, a movable carrier adapted to support a plurality of bellows each having an upwardly extending head with an orifice therein, a casing positioned above the path of movement of said carrier, an opening in said casing adapted to communicate with the orifices of said bellows, vacuum producing means connected to said casing, means for moving said carrier to advance said bellows one after another to a position beneath said casing, means for raising said bellows to bring said orifices into communication with said casing opening whereby the bellows may be evacuated, means for suspending a closure member in said casing directly above said opening and orifice, plunger means for driving said closure member downwardly through said opening and into said orifice to seal said bellows, means for actuating said carrier moving, bellows raising and plunger means in timed relation to evactuate and seal said bellows, and means actuated by the movement of said carrier for delivering successive closure members to said suspension means.

28. In apparatus for evacuating and sealing a vessel having a head with an orifice therein, a block having a bore therein adapted to communicate with the orifice in said head, vacuum producing means connected to said bore, and means for closing the orifice after evacuation including a spring pressed stop member projecting laterally into said bore to obstruct the same and support a closure member, and means for driving said closure member downwardly past said stop member and into said orifice to seal the vessel.

29. In apparatus for sealing vessels of the type having a head with an orifice therein, a rotatable table adapted to support a plurality of vessels thereon, a reservoir for closure members supported above said carrier, sealing means for forcing closure members into the orifices of said vessel heads, and means rotated by said table for individually delivering by gravity successive closure members from said reservoir to said sealing means.

30. In apparatus for sealing vessels of the type having a head with an orifice therein, a rotatable table adapted to support a plurality of vessels thereon, a reservoir for closure members supported above and coaxial with said table, sealing means for forcing closure members into the orifices of said vessel heads, and distributing means mounted coaxially with and secured to said table for rotation therewith for delivering successive closure members from said reservoir to said sealing means.

31. In an apparatus for sealing vessels of the type having a head with an orifice therein, a reservoir for closure members, means for supporting individual closure members, a carrier for moving a vessel into sealing position to align the orifice in its head with a closure member supported by said means, means actuated by said carrier for delivering by gravity individual closure members from said reservoir to said supporting means one at a time for each movement of a vessel into sealing position, and a plunger operated in timed relation with said carrier for forcing said closure member into said orifice.

32. In an apparatus for sealing vessels of the type having a head with an orifice therein, a reservoir for closure members, means for supporting individual closure members, means for moving a vessel into sealing position to align the orifice in its head with a closure member supported by said means, means operated by said vessel-moving means in synchronism with the movement of each vessel into sealing position for releasing a single closure member from said reservoir, said closure member moving by gravity to said supporting means, and means for forcing the closure member into said orifice.

33. In an apparatus for sealing vessels of the type having a head with an orifice therein, a reservoir for closure members, means in alignment with the orifice in a vessel head for receiving a closure member when released from said reservoir and supporting said closure member in alignment with the orifice in said vessel head, means for singly releasing closure members in sequence from said reservoir to pass by gravity to said supporting means, and a plunger for forcing a closure member into said orifice to seal the vessel.

PAUL E. CATE.